United States Patent
Mehas et al.

(10) Patent No.: US 12,276,532 B2
(45) Date of Patent: Apr. 15, 2025

(54) DISPLAY SCREEN POSITION SENSING USING INDUCTIVE SENSING

(71) Applicant: Renesas Electronics America Inc., Milpitas, CA (US)

(72) Inventors: Gustavo James Mehas, Mercer Island, WA (US); Damla Acar, La Mesa, CA (US); Ashley De Wolfe, San Diego, CA (US); Pooja Agrawal, Milpitas, CA (US); Nicholaus Wayne Smith, La Mesa, CA (US)

(73) Assignee: Renesas Electronics America Inc., Milpitas, CA (US)

( * ) Notice: Subject to any disclaimer, the term of this patent is extended or adjusted under 35 U.S.C. 154(b) by 129 days.

(21) Appl. No.: 17/319,659

(22) Filed: May 13, 2021

(65) Prior Publication Data
US 2022/0205816 A1 Jun. 30, 2022

Related U.S. Application Data
(60) Provisional application No. 63/130,454, filed on Dec. 24, 2020.

(51) Int. Cl.
*G01D 5/20* (2006.01)
*G06F 3/03* (2006.01)
*H04M 1/02* (2006.01)

(52) U.S. Cl.
CPC ......... *G01D 5/2066* (2013.01); *G01D 5/2073* (2013.01); *G06F 3/03* (2013.01); *H04M 1/0239* (2013.01); *H04M 1/0268* (2013.01)

(58) Field of Classification Search
CPC .......................... G01D 5/2066; G01D 5/2073
See application file for complete search history.

(56) References Cited

U.S. PATENT DOCUMENTS

| | | | | |
|---|---|---|---|---|
| 4,737,698 A * | 4/1988 | McMullin | ............ | G01D 5/2053 318/653 |
| 5,589,769 A * | 12/1996 | Krahn | .................... | G01D 5/145 324/207.21 |
| 7,038,443 B2 * | 5/2006 | Proksch | ............... | G01D 5/2291 340/870.36 |
| 8,018,715 B2 * | 9/2011 | Chang | .................... | G06F 1/1647 361/679.04 |
| 10,480,580 B2 * | 11/2019 | Maniouloux | .......... | F16C 19/163 |
| 10,613,593 B1 * | 4/2020 | Morrison | ............. | G06F 1/1681 |
| 2015/0362340 A1 * | 12/2015 | Montagne | ............ | G01D 5/2275 324/207.17 |

(Continued)

*Primary Examiner* — Walter L Lindsay, Jr.
*Assistant Examiner* — Milton Gonzalez
(74) *Attorney, Agent, or Firm* — SCULLY, SCOTT, MURPHY & PRESSER, P.C.

(57) ABSTRACT

A method and a system may inductively determine a position of a display screen of a computing device. Associated processes may generate a magnetic field by providing an alternating current to a driver coil, and may generate a voltage at a sensor coil in response to the magnetic field. The system and method may additionally include determining a linear position of the display screen by executing an algorithm at a processor. An input to the algorithm may include voltage data associated with the voltage generated at the sensor coil. The linear position of the display screen may correspond to a size of the display screen between a minimum size and a maximum size.

18 Claims, 13 Drawing Sheets

(56) References Cited

U.S. PATENT DOCUMENTS

| | | | | |
|---|---|---|---|---|
| 2016/0110010 A1* | 4/2016 | Lee | ............... | H04M 1/0235 |
| | | | | 345/173 |
| 2016/0169717 A1* | 6/2016 | Zhitomirsky | .......... | G01D 5/142 |
| | | | | 702/94 |
| 2022/0065662 A1* | 3/2022 | Lu | ................ | G01D 5/2086 |
| 2022/0147098 A1* | 5/2022 | Stewart | ............. | G06F 1/1677 |

* cited by examiner

DISPLAY SCREEN POSITION SENSING USING INDUCTIVE SENSING

CROSS-REFERENCE TO RELATED APPLICATIONS

The present application claims priority to U.S. Provisional Patent Application 63/130,454, entitled "METHOD FOR INDUCTIVE LINEAR POSITION SENSING," filed on Dec. 24, 2020, the subject matter of which is incorporated in its entirety.

TECHNICAL FIELD

The present disclosure relates generally to digital displays for computing systems, and more particularly, to display screens for smart phones and other handheld personal computing devices.

BACKGROUND

Unless otherwise indicated herein, the materials described in this section are not prior art to the claims in this application and are not admitted to be prior art by inclusion in this section.

Smart phones, tablets, and other personal computing devices feature screens displaying graphical user interface (GUI) elements. For example, a user may tap or drag icons to initiate the display of one or more windows containing a photograph, electronic email, or video content on a screen. Certain computing devices, such as slider phones, have flexible screens that allow a user to selectively unfurl or roll up desired portions of screen. In such applications, an operating system onboard the slider phone uses the selected, effective dimensions of the display screen to accurately present and support the GUI elements.

In general, touch screen systems represent one of the more expensive modules in portable applications, and they need to be designed at a lower cost, while still providing a high level of functionality. Most touch screens incorporate optical, resistive, or projected-capacitance sensor technologies for position sensing. Optical sensors are quantized and consequently do not align well with the application specific challenges of sensing phone screen positions. Resistive position sensors require a physical connection between two elements that are moving (e.g., a wiper) and in so doing, introduce a failure point that can degrade accuracy and be vulnerable to foreign material contamination. Capacitive sensor elements provide analog position sensing, but are highly sensitive to vibration.

For these reasons, performance issues associated with conventional sensor elements present obstacles to determining a selected size of a display screen. Further complicating display configurations for smart phones, sensing elements should operate at relatively low battery power, while providing high resolution.

SUMMARY

In some examples, a method of inductively determining a position of a display screen of a computing device is generally described. The method may include generating a magnetic field by providing an alternating current to a driver coil, and generating a voltage at a sensor coil in response to the magnetic field. The method may additionally include determining a linear position of the display screen by executing an algorithm at a processor. An input to the algorithm may include voltage data associated with the voltage generated at the sensor coil. The linear position of the display screen may correspond to a size of the display screen between a minimum size and a maximum size.

In some examples, an integrated circuit configured to inductively determine a position of a display screen of a computing device is generally described. The integrated circuit may include a memory storing an algorithm and a processor configured to access the memory and execute the algorithm to receive voltage data associated with a voltage generated at a sensor coil, wherein the voltage is generated in response to a magnetic field generated at a driver coil; and determine the linear position of the display screen using the voltage data, the linear position of the display screen corresponding to a size of the display screen between a minimum size and a maximum size.

In some examples, a least one non-transitory computer-readable medium comprising instructions that, in response to execution of the instructions by a processor, cause the processor to perform the following operations is generally described. More particularly, the processor may be caused to receive voltage data associated with a voltage generated at a sensor coil. The voltage may be generated in response to a magnetic field generated by a driver coil. The processor may further be caused to determine a linear position of a display screen using the voltage data, the linear position of the display screen corresponding to a size of the display screen between a minimum size and a maximum size.

The foregoing summary is illustrative only and is not intended to be in any way limiting. In addition to the illustrative aspects, embodiments, and features described above, further aspects, embodiments, and features will become apparent by reference to the drawings and the following detailed description. In the drawings, like reference numbers indicate identical or functionally similar elements.

DETAILED DESCRIPTION

Figure 1A:
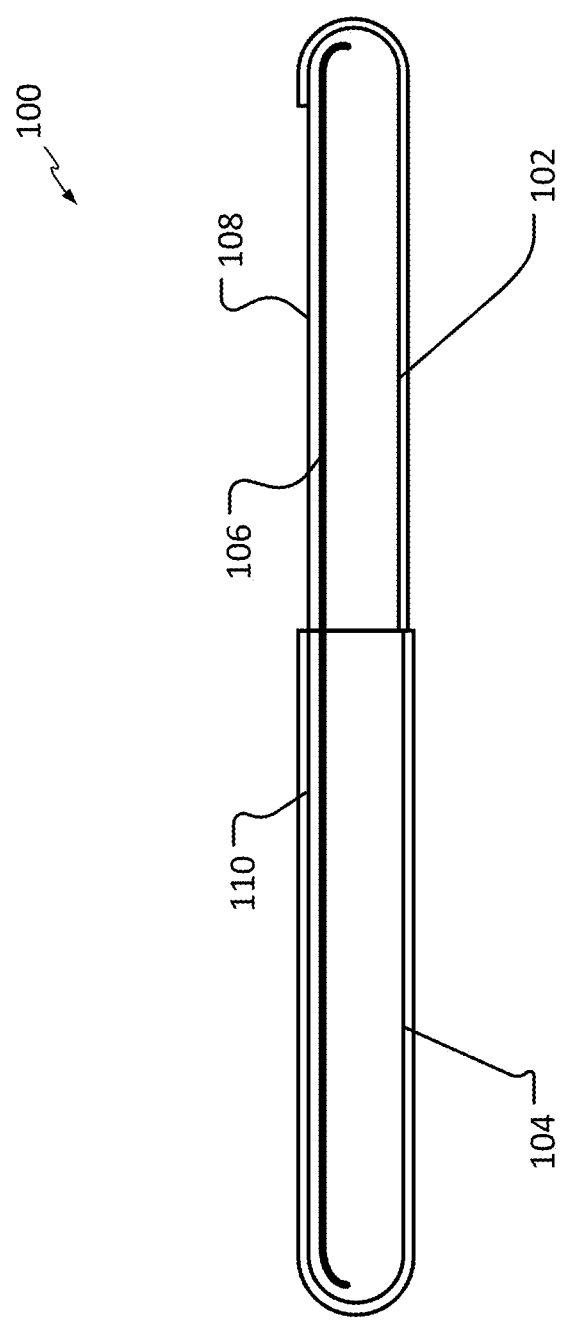
FIG. 1A shows a side view of a slider phone device in an expanded screen position.

In the following description, numerous specific details are set forth, such as particular structures, components, materials, dimensions, processing steps and techniques, in order to provide an understanding of the various embodiments of the present application. However, it will be appreciated by one of ordinary skill in the art that the various embodiments of the present application may be practiced without these specific details. In other instances, well-known structures or processing steps have not been described in detail in order to avoid obscuring the present application.

An implementation of a system and associated method provides an inductive position sensing solution that determines a position of an adjustable display screen of a computing device, such as a slider phone. Put another way, the system may be configured to determine the size and dimensions of a display screen that a user has selected to be viewable and available for use. The determined size and dimensions may be communicated to an operating system of the device so that icons and other graphical user interface (GUI) elements may be effectively spaced, linked, supported, and otherwise presented on the display screen.

An example of the system may include an integrated circuit that generates and couples an alternating current to one or more driver coils. The driver coils, in turn, generate a magnetic field. Two or more sensor coils may generate a voltage based on the received magnetic field that is generated by the driver coils. The system may cause changes in the magnetic field that is picked up by the receiver coil. Target position may be determined by the detected changes in the magnetic field.

More particularly, direct current supplied from smart phone batteries may be converted to alternating current. The driver coils may be used to generate a magnetic flux field, while the sensor coils pick up the magnetic flux field and generate a voltage. The sensor coils may generate an increased voltage at locations where the magnetic flux field is concentrated. In one scenario, the magnetic flux field may be concentrated through a movement of the driver coils with respect to the receiver/sensor coils. In another implementation, the magnetic flux field may be concentrated by a movement of a magnetically active ferrite target. That is, the magnetic flux path inductance and other flux characteristics may be changed due to the movement of the target. One or more targets of varying shapes may be used to increase accuracy.

In one example, a metal layer may be used behind a magnetically active target to improve efficiency and to make magnetic flux peaks more pronounced and detectable. For instance, certain implementations may position a conductive back shield behind the target to reduce power consumption. The shield may concentrate the magnetic flux and to improve coupling between the drive and sensor coils.

A variety of different coil shapes may be used in different applications. Multiple overlapping coils may be used in certain implementations to obtain sufficient position accuracy in order to enable high resolution. That is, multiple coils may result in small pickup voltage requirements, which may translate into higher accuracy. The coils may be of thin construction for use within the space constraints of smart phones. A longer sensor coil may be used to accommodate a more complex magnetic flux pattern that may result from using multiple targets.

In an implementation, an algorithm executed by a processor of the integrated circuit may monitor the voltage changes in the receiver coils to determine a position of the display screen. The algorithm may use at least one of curve fitting techniques, portioning and fitting techniques, as well as weighted voting techniques to determine position. In one example, a curve fitting technique may be applied to coil voltages to determine the position based on voltage peaks with respect to generated alternative current voltages. In another or the same example, the system may map peak coil voltages to known positions. In still another or the same example, position measurements may be determined from all coil data using a weighted voting algorithm to determine the screen position.

The detection algorithm may receive inputs comprising coil thickness and/or geometric variation data to account for asymmetric flux linkages at the ends of the coils. For instance, the geometries of coils proximate the ends may be compressed or otherwise vary from coils nearer the center. Unwanted shifting of the peak voltage detection signals may be due to flux linkages associated with connecting traces. As explained herein, a peak voltage may correspond to a particular coil most physically proximate the target. In this manner, accurate coil peak voltage determinations may facilitate position determination. The unwanted magnetic flux may be mitigated by routing coil connecting traces and by changes to the flux geometry of the system. An example of a change to the flux geometry may include a flattening out of peaks. Minimum system power consumption may be determined by generating a three-dimensional plot or by otherwise characterizing a coil signal strength and a power dissipation figure of merit (e.g., a simple product or weight products) versus an LC resonant frequency and pulse width modulation (PWM) drive frequency. The LC resonant frequency may result from driver inductance and series resonant energy recover capacitance.

Input filters may be used to remove system noise that could otherwise degrade the accuracy of a position measurement. These filters may be incorporated into the integrated circuit. Digital filtering of the coil voltage measurements may also be used.

In one configuration, position measurements may be rapidly turned on and off to preserve power. For instance, position measurements may not be continuously taken. Position measurements in one scenario are only taken when needed. The system may instead send pulses to preserve power and avoid damage to vulnerable circuitry. Inductive resonant principles may be used to preserve power and reduce electromagnetic interference caused by the magnetic fields of the driver coil.

An LC resonant frequency and a driver coil frequency, as well as a duty cycle, may be determined to minimize an amount of energy used during an operation to determine a position measurement. For example, the LC resonant frequency may be determined based on the inductance of the driver and the series resonant energy capacitance of a recover capacitor. In one example, zero voltage switching (ZVS) converter techniques may be used to increase efficiency and to minimize electromagnetic interference associated with the driver coil.

Among other benefits associated with the position determining techniques described herein, the magnetic fields may be determined by relatively robust circuitry compared to conventional position sensing circuitry. For instance, there may be no optical sensor that could become blinded over time by dirt and dust. Moreover, aluminum shavings or other contaminants that could be introduced by sliding the phone display back and forth may have very little detrimental impact on performance.

An implementation of a linear position sensing system may use a single integrated circuit for both the driver coil and the sensor coil. This configuration may obviate a need for power transfer. The driver and receiver coils may provide a constant, continuous or intermittent set of detection signals over an entire length of which the position is being monitored.

The system may provide accurate x-y positioning on the display screen while being powered by the relatively thin-type batteries that are found in smart phones and other handheld computing devices. The same implementation may enable high resolution (e.g., over three-hundred points per inch).

Now turning more particularly to the drawings, FIG. 1A illustrates a side view of a slider phone device 100 in an expanded screen position. A first section 102 of the slider phone device 100 may be configured to slide into a second section 104 of the slider phone device 100. A flexible display screen 106 may be attached proximate to respective top surfaces 108, 110 of the first and second sections 102, 104. The display screen 106 may be configured to selectively slide underneath the top surfaces 108, 110 of the first and second sections 102, 104. At least a portion of the top surfaces 108, 110 may be constructed from a translucent material, such as glass or plastic, to minimize obstructing a view the display screen 106 from the user.

Sliding the first and second sections 102, 104 back and forth with respect to one another may expand and contract the visible and usable surface area of the display screen 106. One implementation may use motors to actuate one or more of the first and second sections 102, 104. Another configuration may allow the hands of the user to manipulate the relative positions of the first and second sections 102, 104, and in so doing, the visible and usable surface area of the display screen 106.

Figure 1B:
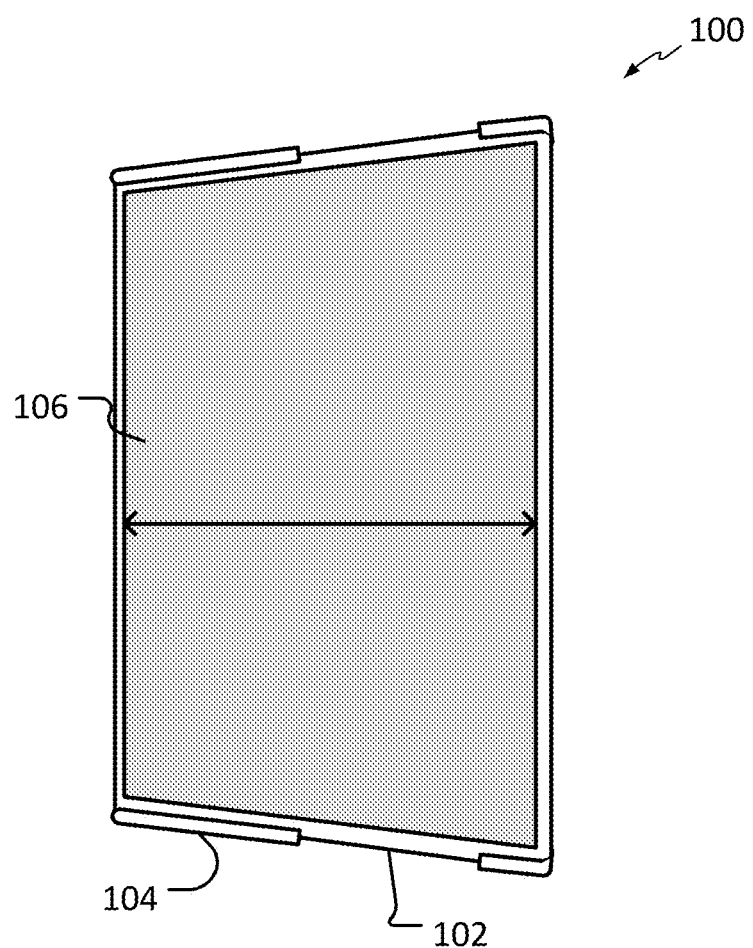
FIG. 1B shows a perspective view of the slider phone device of FIG. 1A in an expanded screen position.

FIG. 1B shows a perspective view of the slider phone device of FIG. 1A, also in an expanded screen position. As illustrated, the display screen 106 is expanded nearly to its maximum size. That is, the first and second sections 102, 104 have been slid linearly in opposite directions from one another to expand the visible and usable surface area of the display screen 106.

In the manner described above, a user may select a preferred size of the flexible display screen 106 for a particular activity. As discussed herein, an operating system (not shown) internal to the slider phone device 100 may receive data pertaining to the current position (e.g., expanded or nearly expanded) of the display screen 106 in order to effectively arrange and display icons and other GUI elements.

Figure 2A:
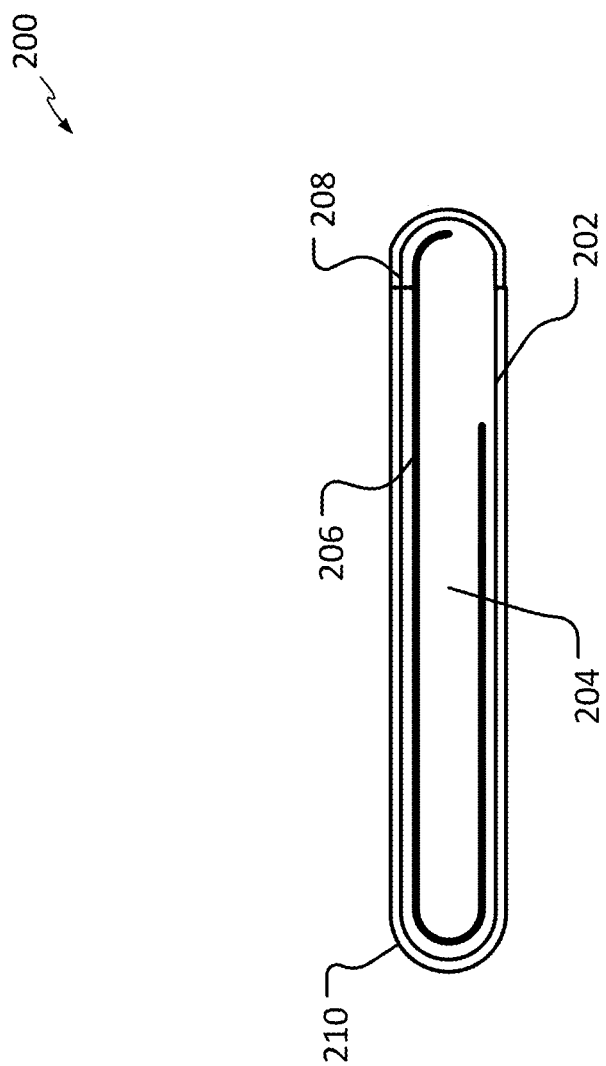
FIG. 2A shows a side view of a slider phone device, such as the device of FIG. 1A, in a collapsed screen position.

FIG. 2A illustrates a side view of a slider phone device 200, such as the slider phone device 100 of FIGS. 1A and 1B, but in a collapsed screen position. As a first section 202 slides into a second section 204, the useful area and visible portion of a display screen 206 is reduced. The display screen 206 may be configured to slide underneath the top surfaces 208, 210 of the first and second sections 202, 204, respectively. At least a portion of the top surfaces 208, 210 may be constructed from a translucent material so as to not obstruct the view of the display screen 206 from the user.

Figure 2B:
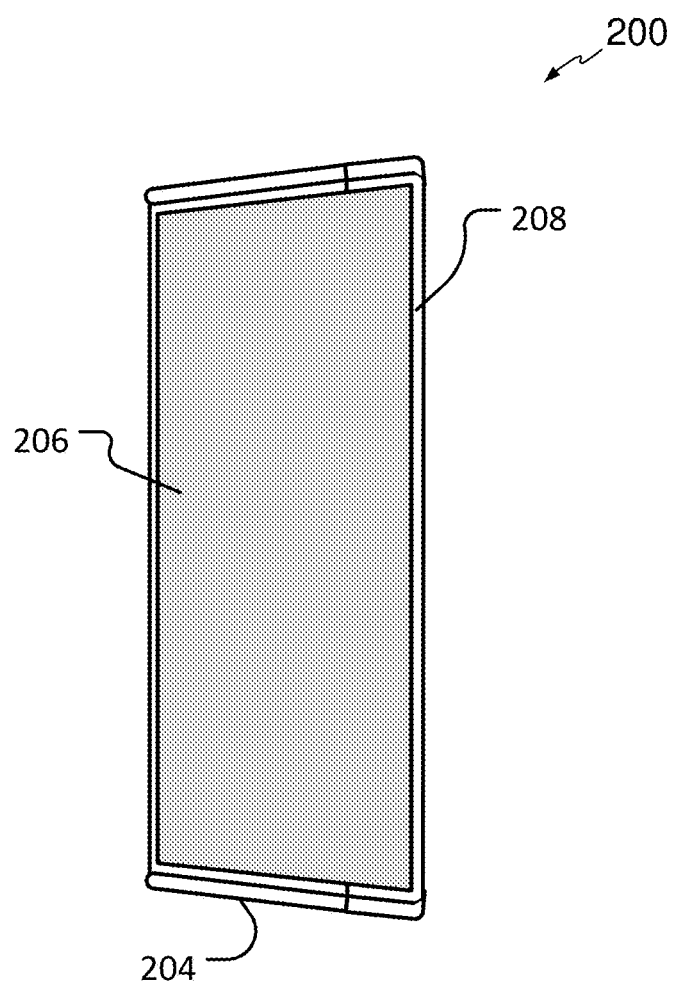
FIG. 2B shows a perspective view of the slider phone device of FIG. 2A in a collapsed screen position.

FIG. 2B shows a perspective view of the slider phone device of FIG. 2A, also in a collapsed screen position. As illustrated, the display screen 206 is contracted nearly to its minimum screen size. That is, the first section 102 (not shown) 104 have been slid linearly towards and inside of the second section 204 to contract the visible and usable surface area of the display screen 106.

One skilled in the art will appreciate that implementations of the system discussed herein contemplate all display screen positions between fully expanded and contracted. For example, a configuration may constantly determine new positions (and associated display surface areas and layouts) as the display screen is being adjusted between and expanded and contracted positions, or some intermediary position.

Figure 3:
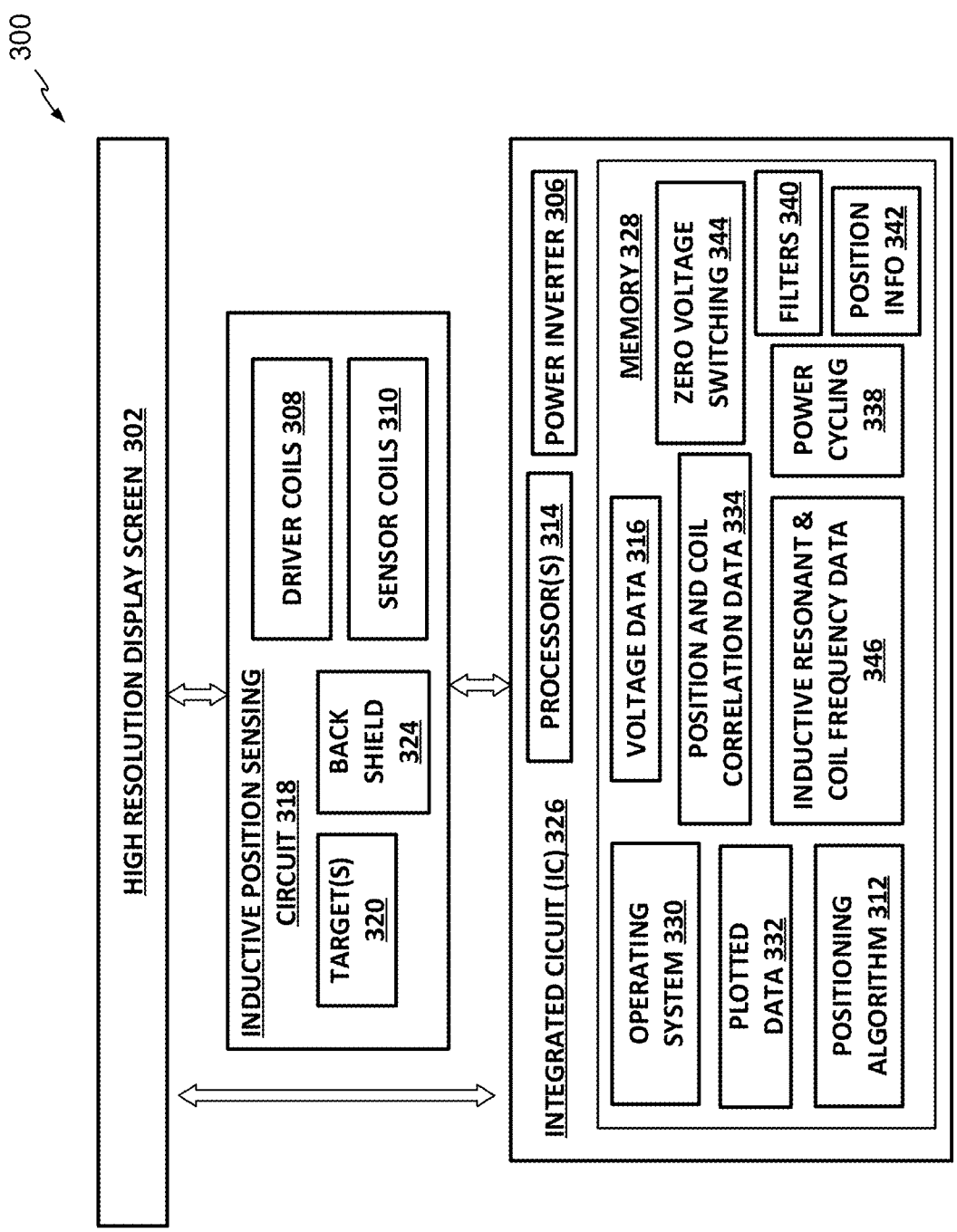
FIG. 3 is a block diagram of a system configured to inductively determine a position of a display screen of a computing device.

FIG. 3 is a block diagram of an embodiment of a system 300 configured to inductively determine a position of a display screen 302 of a computing device. Associated processes may generate a magnetic field by providing an alternating current from a power inverter 306 of an integrated circuit (IC) 326 to driver coils 308. Sensor coils 310 may generate a voltage in response to the magnetic field introduced by the driver coils 308. The system 300 may additionally determine a position of the display screen 302 by executing algorithms, shown collectively as a positioning algorithm 312, at a processor 314. An input to the algorithm 312 may include voltage data 316 associated with the voltage generated at the sensor coils 310.

The driver and sensor coils 308, 310 may comprise part of inductive position sensing circuit 318. One or more targets 320, as well as shielding 324, may also be included in the inductive position determination circuit 318. The inductive position determination circuit 318 may output the voltage data 316 to the processor 314.

The processor 314 may comprise part of the IC 326. Among other functions, the IC 326 may provide the alternating current to the driver coils 308. The IC 326 may additionally include a memory 328. The memory 328 may include an operating system 330. The operating system 330 may receive screen position information 342 that it uses to configure GUI elements on the available, selected portions of the display screen 302. The memory 306 may also store the algorithm 312, as well as filtering programs 340 used to remove system noise that could otherwise degrade the accuracy of a position measurement. Arrows in FIG. 3 represent the exchange of power, computing instructions, and other signals between the display screen 302, the inductive sensing circuit 318, and the IC 326.

An implementation of system 300 may use a single IC 326 for both the driver coils 308 and the sensor coils 310. This configuration may obviate a need for power transfer under certain conditions. For example, there may be no need to have a power transfer as the IC 326 may be powered by the pickup of the sensor coils 310. In certain implementations, the data may be relayed back wirelessly (e.g., using ASK back channel communication techniques). The driver and receiver coils 308, 310 may provide a constant, continuous or intermittent set of detection signals over an entire length of which the position of the display screen 302 is being monitored. To this end, a power duty cycling function 338 may be executed by the processor 314. The power duty cycling function 338 may cause position measurements to not be continuously taken. The system may instead send pulses to preserve power and avoid damage to vulnerable circuitry. The duty cycle power the power cycling function 338 may be determined to minimize an amount of energy used during an operation to determine a position measurement.

The memory 328 may additionally include graphs/plotted data 332, as well as known coil locations 334 in a stored association with screen positions. ZVS converter techniques 344 may be used to increase efficiency and to minimize electromagnetic interference associated with the driver coil. In addition to information relating to the applied duty cycling 338, LC resonant frequency and a driver coil frequency data 346 may be determined to minimize an amount of energy used during an operation to determine a position measurement. Inductive resonant principles may be used to preserve power and reduce electromagnetic interference caused by the magnetic fields of the driver coil.

Figure 4:
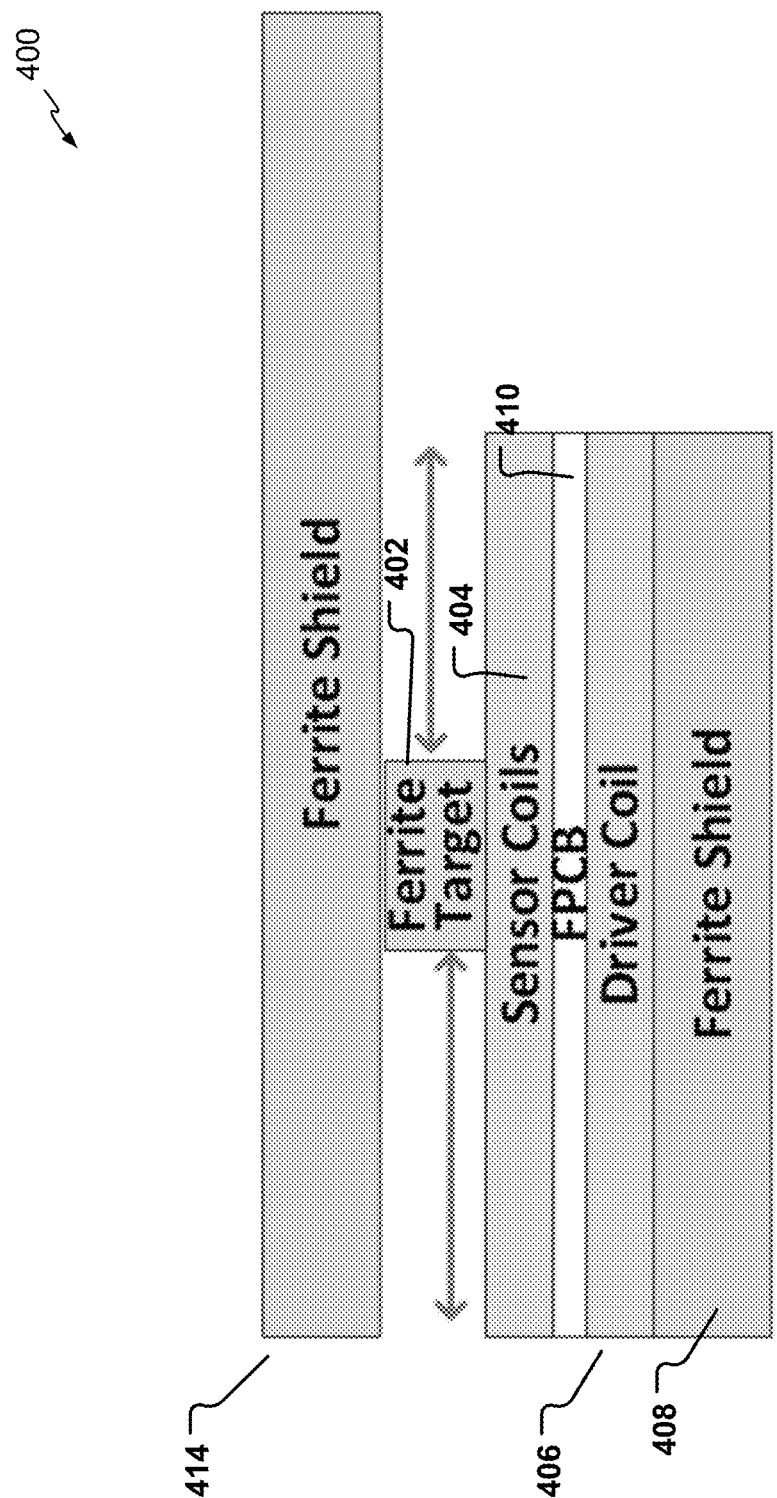
FIG. 4 is a block diagram of an example of a system configured to determine a position of a display screen.

FIG. 4 is a block diagram of an example of a system 400 configured to facilitate determining a position of a display screen. The determined position may indicate the size and dimensions of a display screen that a user has selected to be viewable and available for use. The system 400 may be similar to the inductive sensing circuit 318 of FIG. 3. According to one configuration, the illustrative position sensing system 400 may be located beneath and proximate to the display screen of a smart phone (such as the display screen 106 of the slider phone device 100 of FIG. 1A, though typically separated by diffuser and light emitting diode (LED) backlit layers (not shown). Where a target 402 is present as shown in FIG. 4, the target 402 may be attached to a portion of the phone that includes the display screen. The target of another embodiment may alternatively be attached to a base of slider phone, opposite the display screen.

Turning more particularly to FIG. 4, the system 400 generates a voltage used to determine a position of a display screen on a slider phone device. The illustrative system 400 may include a target 402 that may traverse a distance (e.g., indicated by arrows) proximate sensor coils 404. The target 402 may be proximate a ferrite shield 414 for protecting other circuitry in the slider phone, as well as for focusing the magnetic influence of the target 402. The target 402, shown as being ferrite in FIG. 4, may comprise other magnetically active metals. The shield 414 may be positioned to contain and concentrate the magnetic field for efficiency considerations. For example, an uncontained magnetic field could harm other circuitry in the slider phone. This consideration is balanced with configuring and positioning the shield so as to not substantially reduce the magnetic influence and signature of the target.

Driver coil 406 may be electronically coupled with the sensor coils 404. A flexible printed circuit board 410 (FPCB) is shown sandwiched between the driver and sensor coils 404, 406. A ferrite shield 408 may be positioned proximate the driver coils 406.

The driver coils 406 may be used to generate a magnetic flux field, while the sensor coils 404 pick up the magnetic flux field and generate a voltage. The sensor coils 404 may generate an increased voltage at locations where the magnetic flux field is concentrated. In the example of FIG. 4, the magnetic flux field may be concentrated by a movement of the magnetically active target 402. That is, the magnetic flux path inductance and other flux characteristics may be changed due to the movement of the target 402. In other implementations, one or more targets of varying shapes may be used to increase accuracy. In the example, the ferrite shield 414 may be used behind a magnetically active target 402 to improve efficiency and to protect circuitry above the coils 406.

A target, such as the target 402 shown in FIG. 4, may comprise an object that influences a magnetic field. The target is typically not a magnet, itself, but may include for instance, copper or a soft magnetic material. A soft magnetic material may comprise a metal that is readily magnetized and demagnetized, such as ferrite. Moreover, differently shaped targets are contemplated. The shape of the target 402 may be selected to facilitate generating a desired magnetic field. While only one target is shown in FIG. 3, other implementations may use multiple targets.

Figure 5:
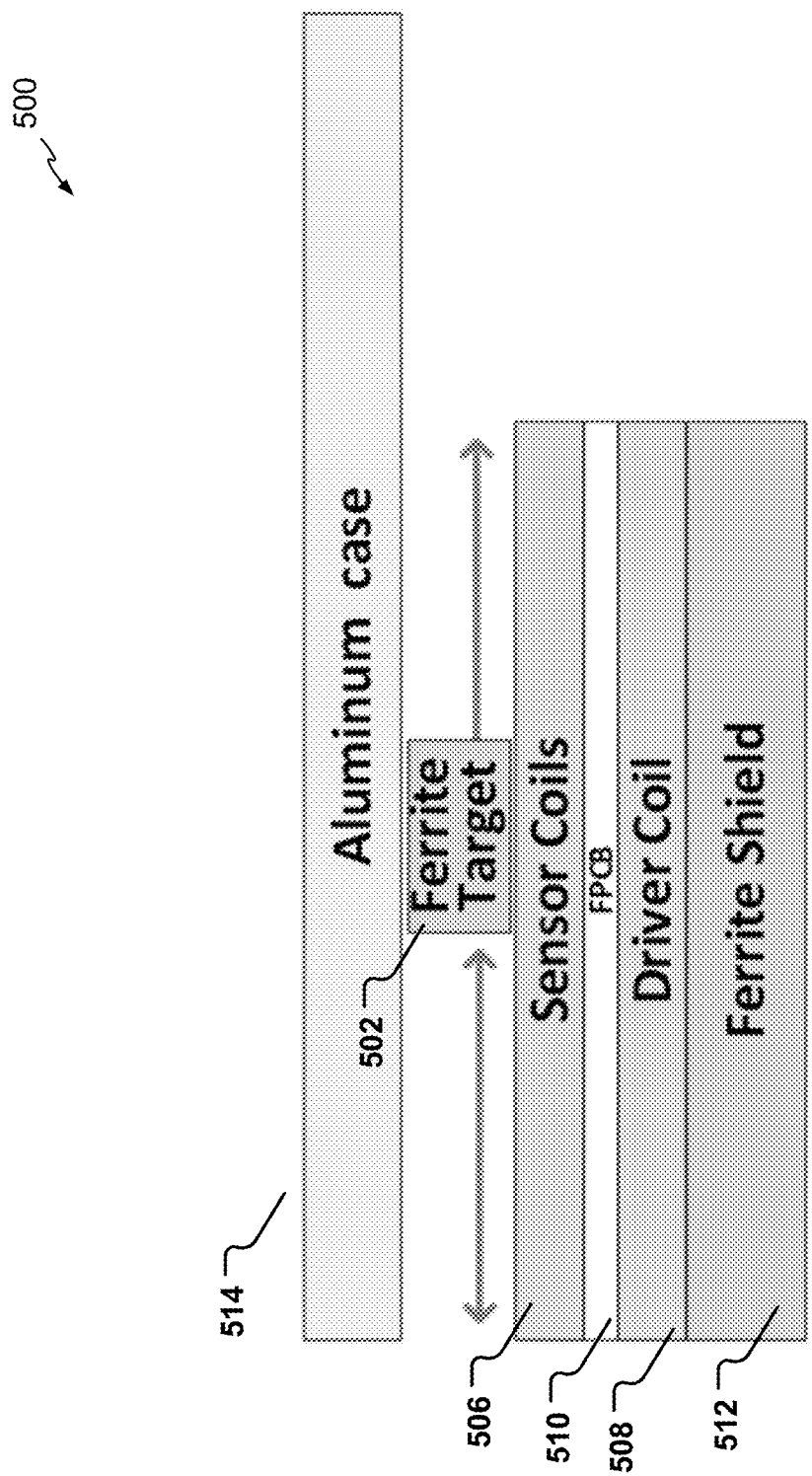
FIG. 5 is a block diagram of a system to generate a voltage that is used in conjunction with a ferrite target and an aluminum case to determine a position of a display screen on a computing device.

FIG. 5 is a block diagram of a system 500 to generate a voltage that is used in conjunction with a target 502 and an aluminum case/shield 514 to determine a position of a display screen (not shown) on a slider phone device. For instance, the configuration may make magnetic flux peaks more pronounced and detectable. The illustrative target 502 may comprise ferrite. The target 502 may traverse a distance (e.g., indicated generally by arrows) proximate sensor coils 506. The ferrite target 502 may be proximate the aluminum shield 514 for protected other circuitry in the slider phone, as well as for focusing the magnetic influence of the target 502. For instance, certain implementations may position a conductive back shield behind the target to reduce power consumption. This consideration is balanced with configuring and positioning the shield 514 so as to not substantially reduce the magnetic influence and signature of the target 502. To this end, an implementation of the system use aluminum, instead of ferrite (e.g., as in the system of FIG. 4). The shield 514 may concentrate the magnetic flux and to improve coupling between the driver coils 508 and sensor coils 506. The use of aluminum may make the peaks more defined because the eddy current effects of the aluminum may extend outside of the aluminum, thereby causing the sensor coil pickup to be suppressed. That is, the sensor coil pickup may be lower than a free air configuration. A second ferrite target (not shown) may be used in different configurations. As discussed herein, the use of multiple targets may reduce the number of required sensor coils or compensate for gaps that can occur due to mechanical constraints. Alternatively, a gap (not shown) between the first ferrite target 502 and the second ferrite target may comprise a target of another embodiment. In still another configuration, an aluminum/ferrite target may comprise an aluminum window in a ferrite sheet that covers the aluminum.

The driver coils 508 may be electronically coupled with the sensor coils 506. A flexible printed circuit board 510 is shown sandwiched between the driver and sensor coils 506, 508. A ferrite shield 512 may be positioned proximate the driver coils 506.

The driver coils 508 may be used to generate a magnetic flux field, while the sensor coils 506 pick up the magnetic flux field and generate a voltage. The sensor coils 506 may generate an increased voltage at locations where the magnetic flux field is concentrated. In the example of FIG. 5, the magnetic flux field may be concentrated by a movement of the magnetically active ferrite target 502. That is, the magnetic flux path inductance and other flux characteristics may be changed due to the movement of the target 502. In other implementations, one or more targets of varying shapes may be used to increase accuracy. In the example, the aluminum shield 514 may be used behind a magnetically active target 502 to improve efficiency and to make magnetic flux peaks more pronounced and detectable.

Figure 6:
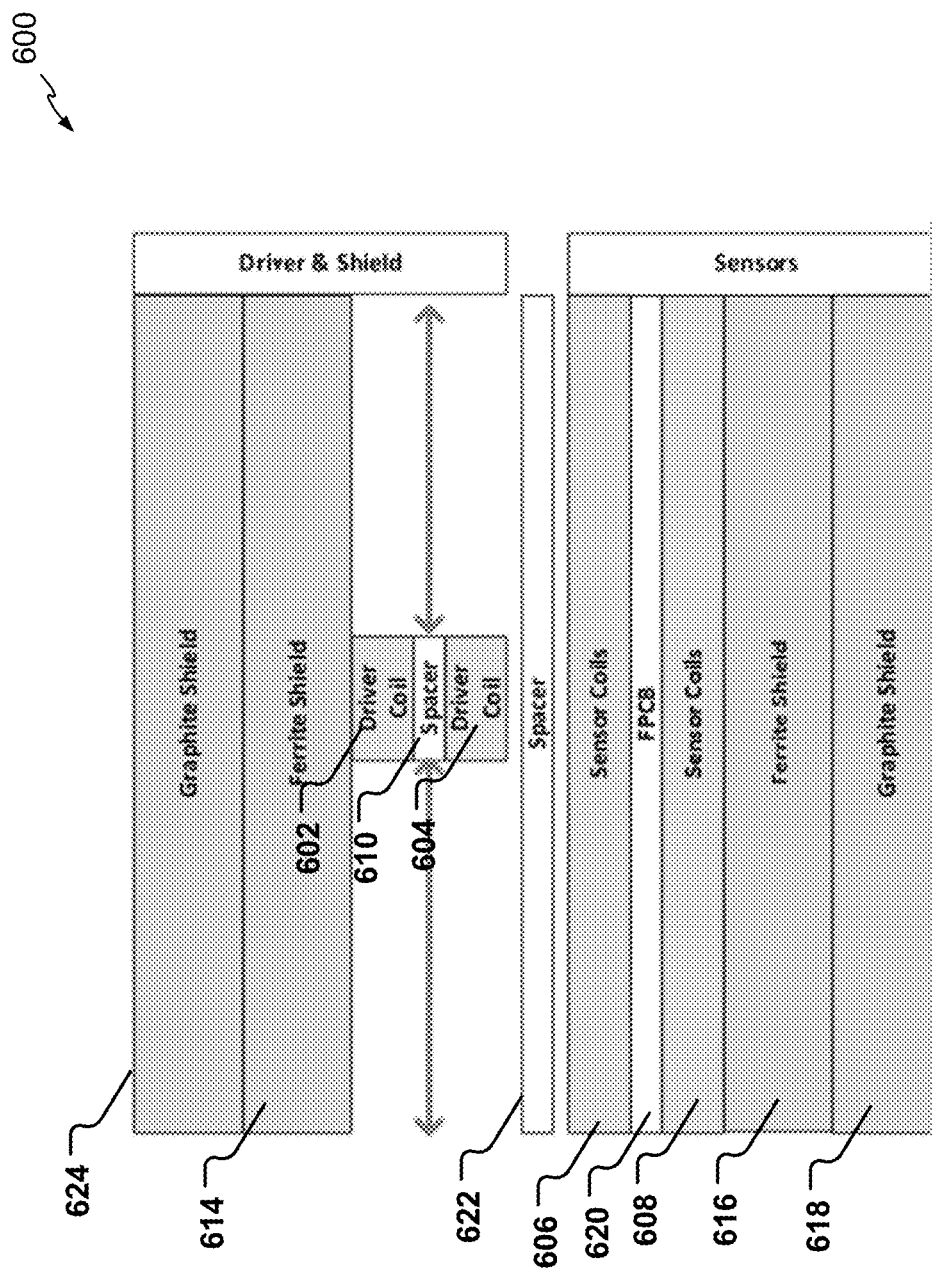
FIG. 6 is a block diagram of a system configured to determine a position of a display screen by concentrating a magnetic flux field through a movement of the driver coils with respect to the sensor coils.

FIG. 6 is a block diagram of a system 600 configured to determine a position of a display screen by concentrating a magnetic flux field through a movement of the driver coils 602, 604 with respect to the receiver, or sensor coils 606,

608. As shown in the drawing, the system 600 includes driver coils 602, 604 that are separated by a spacer 610. The driver coils 602, 604 may traverse a distance indicated by the arrows in FIG. 6. In so doing, the driver coils 602, 604 may generate the magnetic field, and ultimately the voltage data, used to determine display screen position. In the illustrative system 600, a target may actively generate a magnetic field instead of passively concentrating the field, as in FIGS. 4 and 5.

While a ferrite shield 614 is shown in the embodiment, another implementation may use a pot core that is positioned around the driver coils 602, 604 to focus magnetic fields on those sensor coils 606, 608 most proximate to the driver coils 602, 604. The sensor coils. 606, 608 may be separated by a flexible printed circuit board (FPCB) 620, and the driver coils 602, 604 may be separated from the sensor coils 606, 608 by a spacer 622.

The system 600 also includes a ferrite shield 616 proximate the sensor coils 606, 608, as well as graphite shields 618, 624. One skilled in the art will appreciate that while a target and/or a driver coils 602, 604 may be attached to and move in conjunction with the display screen as in FIG. 6, another implementation may have the sensor coils move with the display screen. That is, either configuration may result in changes in magnetic flux between the driver and sensor coils 602, 604, 606, 608 that can be translated by an algorithm into x-y position data that tracks screen position. In a particular embodiment of the system, a target comprises a "not target," or "negative target," where the absence of some material is used to modify the voltage response of the sensor coils to a magnetic field.

Figure 7:
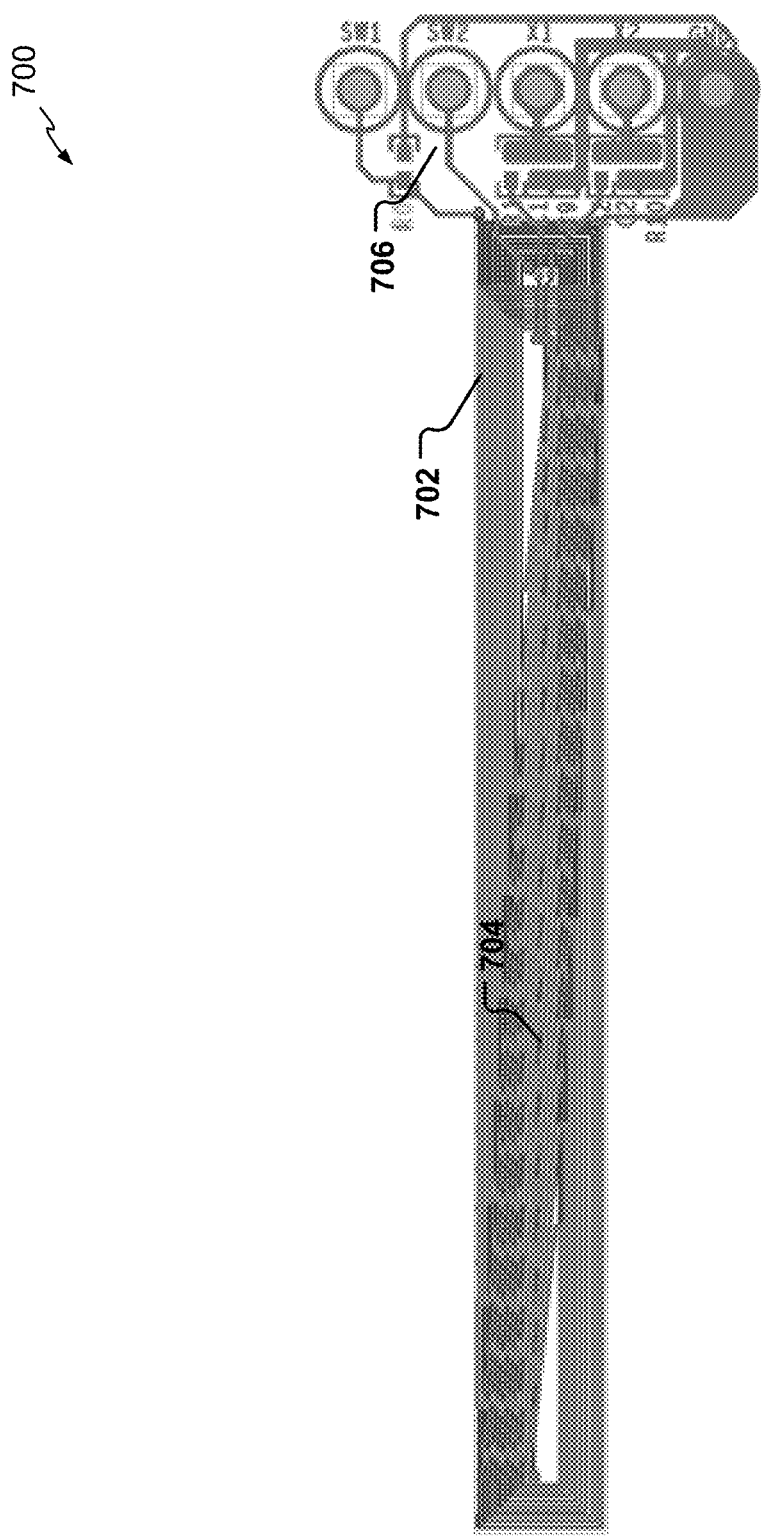
FIG. 7 is an illustration of a first configuration of a coil, such as may comprise a sensor or driver coil in a preceding embodiment.
Figure 8:
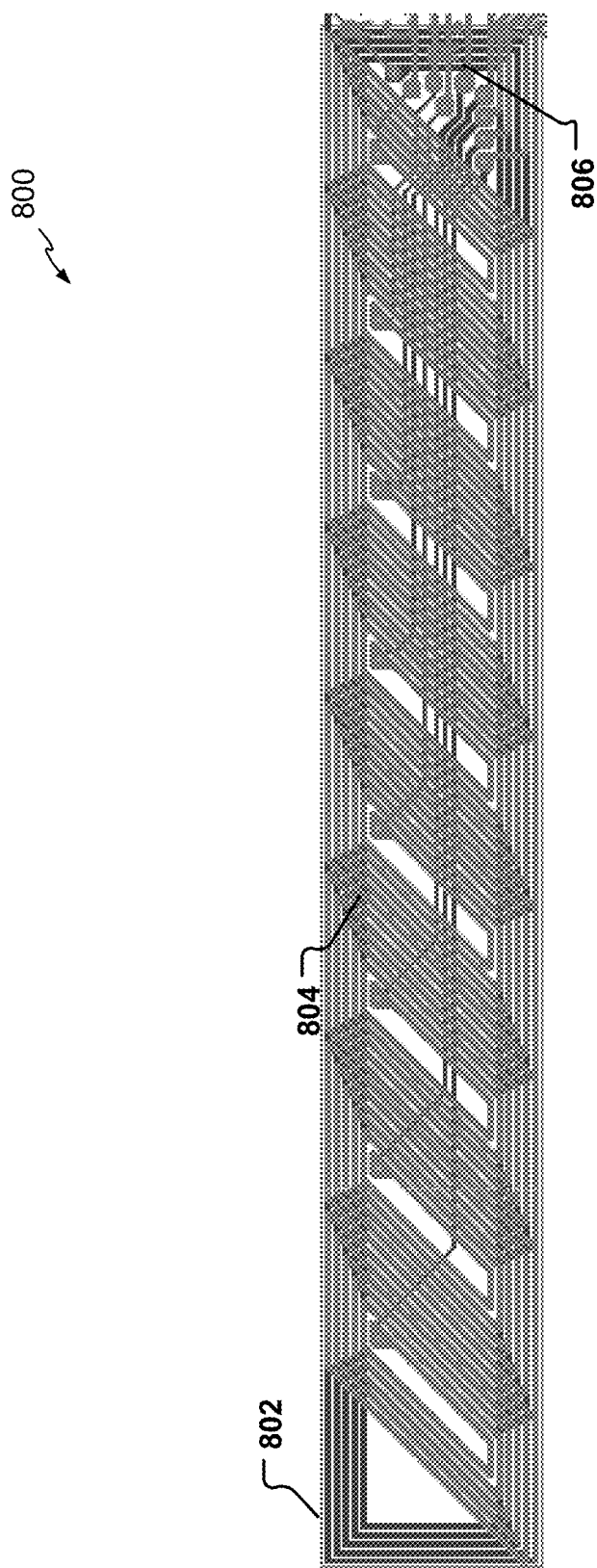
FIG. 8 is an illustration of a second configuration of a coil, such as may comprise a sensor or driver coil in a preceding embodiment.
Figure 9:
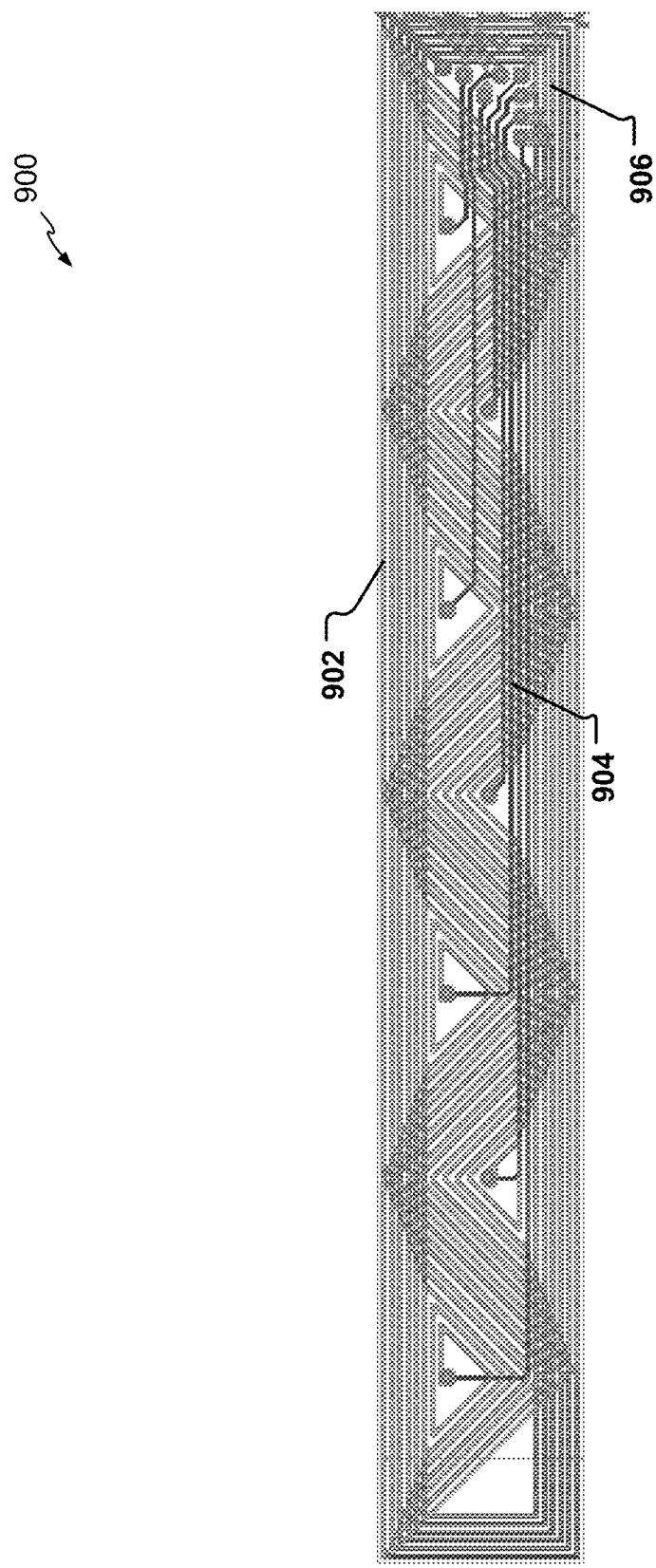
FIG. 9 is an illustration of a third configuration of a coil, such as may comprise a sensor or driver coil in a preceding embodiment.

FIGS. 7, 8, and 9 show different sensor coil configurations 700, 800, 900 that may be used in connection with the systems and methods disclosed herein. While the three sensor coil configurations 700, 800, 900 demonstrate some variance, other implementation contemplate a wider variety of different coil shapes. Generally, the sensor coil configurations 700, 800, 900 feature multiple overlapping coils to obtain sufficient position accuracy in order to enable high resolution. That is, multiple coils may result in small pickup voltage requirements, which may translate into higher accuracy. The coil wiring and windings may be of thin construction for use within the space constraints of smart phones.

With regard to the coil configuration 700 of FIG. 7, rectangularly configured coil wiring 702 is partially overlain, or overlapped, with diagonally oriented coil wiring 704. Connecting traces and other connection circuitry 706 are also shown in the figure. As with the other coil configurations 800, 900, the coil configuration 700 in FIG. 7 may include singled-ended coils that produce a raw alternating current waveform. The coil configuration 700 may function as an inductor that stores energy in a magnetic free space, e.g., generating a magnetic field. The multiple turns of the coil configuration 700 are useful in generating multiple magnetic flux fields.

The coil configuration 800 of FIG. 8 illustrates rectangularly configured coil wiring 802 that is partially overlapped by parallelogram-shaped and diagonally oriented coil wiring 804. The coil wiring 804 is oriented in a parallel manner with respect to one other. The coil configuration also illustrates connecting traces 806.

FIG. 9 illustrates a coil configuration 900 that includes rectangularly configured coil wiring 902 that is partially overlapped by parallelogram-shaped and diagonally oriented coil wiring 904. The coil wiring 904 is oriented in end to end with respect to one other. The coil configuration also illustrates connecting traces 906. As with other embodiments disclosed herein a longer sensor coil may be used to accommodate a more complex magnetic flux pattern that may result from using multiple targets.

While singled-ended coils are shown in FIGS. 7-9, another configuration may use differential coils, which may include two transformers that are counter-wound. The differential coils may produce zero volts in an absence of (e.g., when uncoupled to) a target. The differential coils may enable an increase in the signal to noise ratio. The differential coil may additionally use only one pin on an integrated circuit, allowing for more coils in a configuration.

Figure 10:
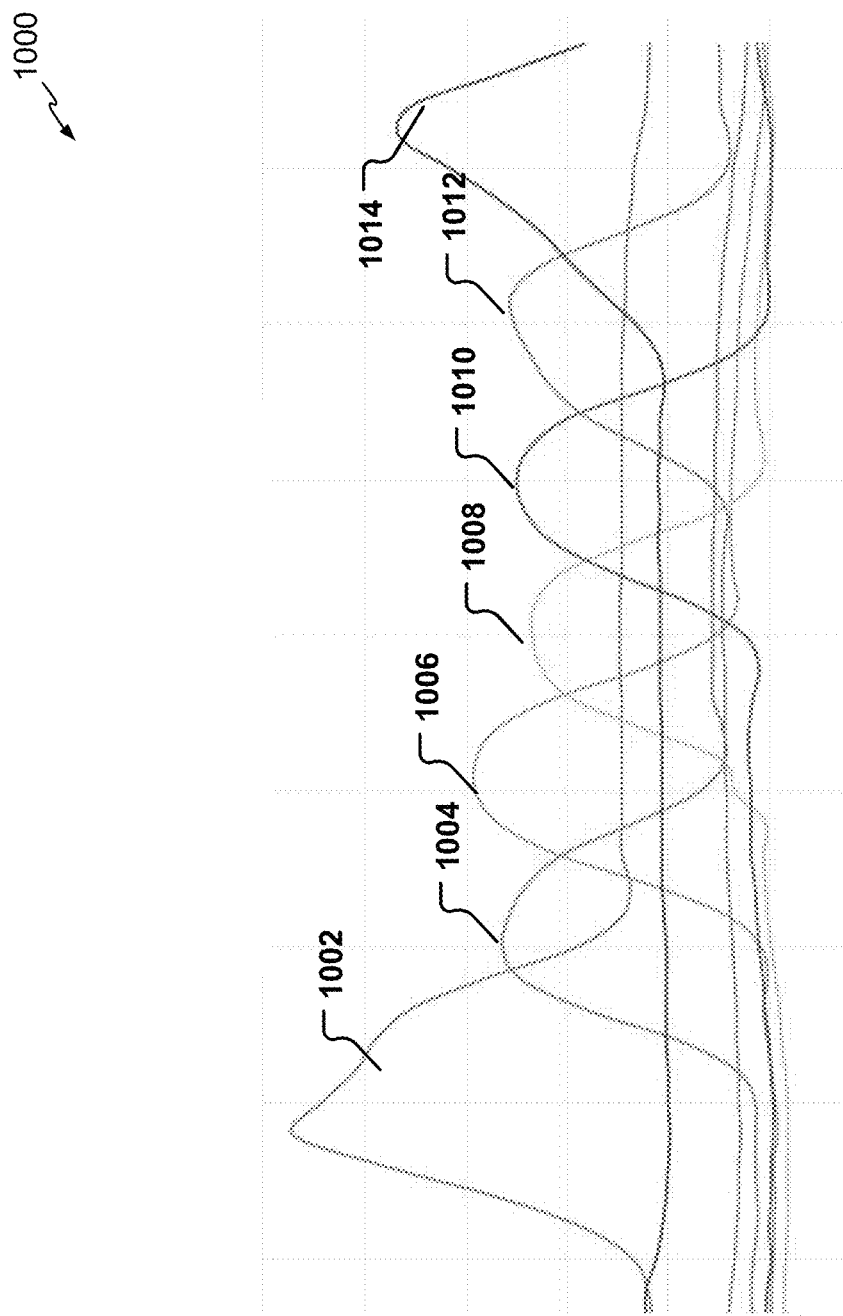
FIG. 10 is a graph of sensor coil voltages as a function of position as generated by an algorithm for use in determining the position of the display screen.

FIG. 10 is a graph 1000 of sensor coil voltage signals 1002, 1004, 1006, 1008, 1010, 1012, and 1014 as a function of position. The signals 1002, 1004, 1006, 1008, 1010, 1012, and 1014 may be generated by an algorithm stored in a memory and executed by the processor of the integrated circuit for use in determining the position of a display screen. The waveforms defining the signals 1002, 1004, 1006, 1008, 1010, 1012, and 1014 may comprise examples of coil voltages as a target moves across a sensor coil array. Namely, the y-axis of the graph 1000 may plot sensor coil pickup voltages versus position plotted along the x-axis. Each of the voltage signals 1002, 1004, 1006, 1008, 1010, 1012, and 1014 may be associated with a respective coil, such as the sensor coils 310 of FIG. 3.

Graphed voltages fluctuations produced by the sensor coils may mirror the changing magnitudes of magnetic fields as a target or driver coil moves closer to the sensor coils. Because the processor knows that the relative movement of either of the target or driver coils relative to the sensor may be associated with movement of the display screen, the algorithm may determine an x-y position based on location of the sensor coil that is generating a voltage waveform magnitude (e.g., a peak) known to be associated with a coil, and by association with the a particular screen position, the current position of the computing device display screen.

More particularly, the algorithm may monitor and graph voltage changes in the sensor coils to determine the position of the display screen. In one example, a curve fitting technique may be applied to coil voltages to determine the position based on voltage peaks with respect to generated alternative current voltages. In another or the same example, the system may map peak coil voltages to known coil and/or display screen positions. For instance, the algorithm may recognize that a peak voltage 1002 at a coil may indicate that a target is proximate the particular coil or set of coils. Since the target moves in conjunction with the display screen, the algorithm may determine an x-y position based on location of the coil that is associated with the voltage peak.

An ideal waveform of one implementation may have a triangular shape, such as in waveform 1014, with a constant upwards slope to a pronounced peak voltage, and then may reverse from the peak with a constant negative slope back down. Different algorithms and filters may be applied to generate curves intended to improve the signal to noise ration. For instance, curve fitting, portioning and fitting techniques, as well as weighted voting techniques may be used to help determine position. In one example, a curve fitting technique may be applied to coil voltages to determine the position based on voltage peaks with respect to generated alternative current voltages. In another or the same example, the system may map peak coil voltages to known positions. In still another or the same example, position measurements may be determined from all coil data using a weighted voting algorithm to determine the screen position.

The processor may recognize that the first waveform 1004 associated with a first coil peaks or rises to 0.2 volts, while a second voltage signal 1002 associated with a second coil has risen to 0.6 volts. The processor may determine from the plotted measurements that the target is near the second coil. That is, the processor may estimate where the target is based on a characteristic signal with respect to voltage. The analysis may consider the changes in the waveform associated with multiple neighboring and distant coils to determine whether the target is more on the left-hand or right-hand side of the coil. As such, the system may encode position data based on the concurrent coupling of two coils.

While only one target is illustrated in the graph of FIG. 10, another implementation may include multiple targets. In such a scenario, each target may be associated with a main voltage peak, which is in turn associated with a coil, but the other waveforms may be concurrently considered using additional computational operations. The multiple targets may be offset to generate peaks that eliminate low signal to noise ratio areas. The offset may help reduce the number of required sensor coils or compensate for gaps that may occur due to mechanical constraints.

Figure 11:
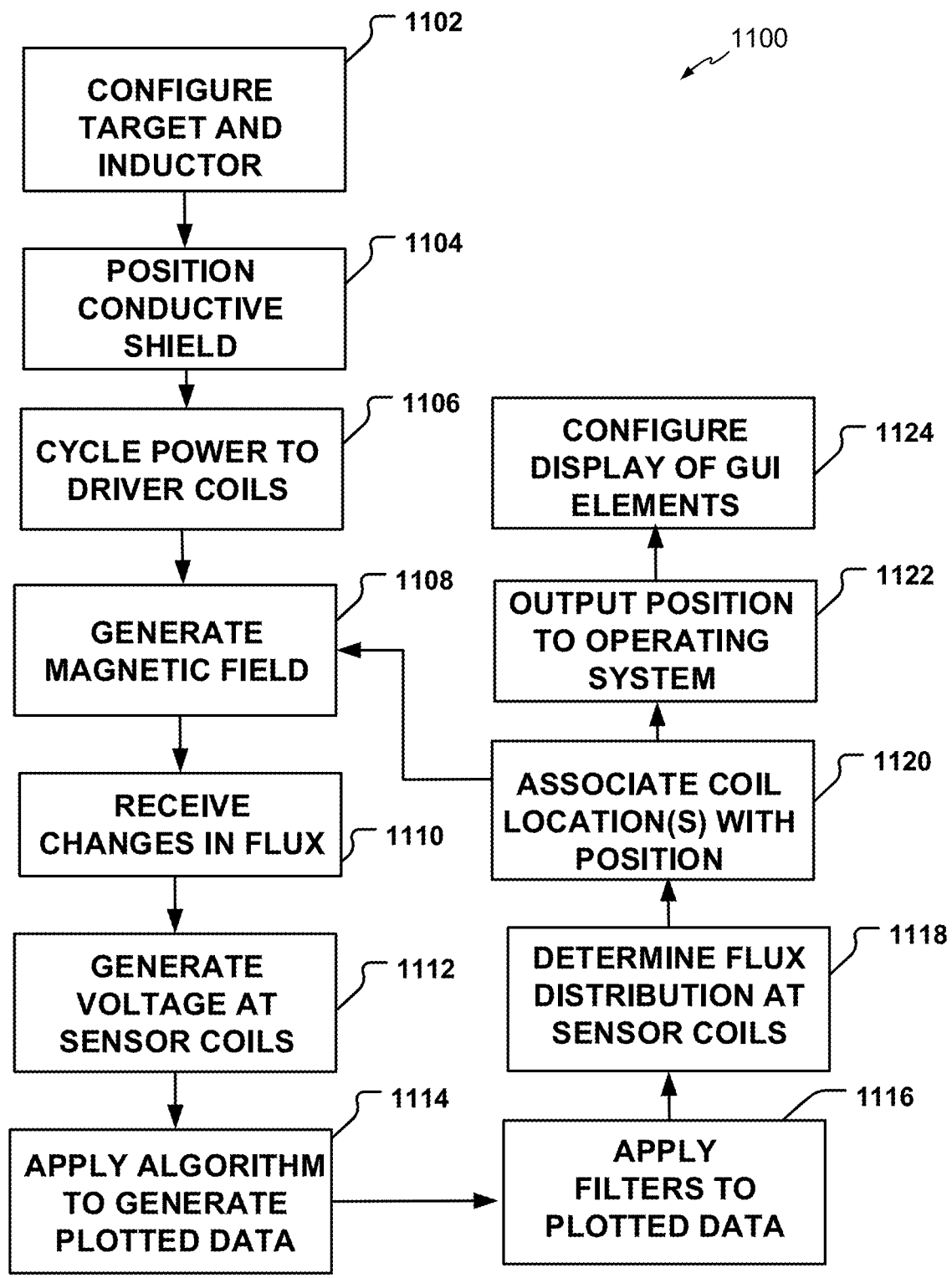
FIG. 11 is a flowchart of an example of a method that may be performed by embodiments of the system.

FIG. 11 is a flowchart of an example of a method 1100 that may be performed by an embodiment of the system to inductively determine a position of a display screen of a computing device. For instance, the method 1100 may be performed by the systems shown in illustrative FIGS. 1-5. Turning more particularly to the flowchart, the method 1100 at 1102 may include positioning driver and sensor coils to form a transformer, as well as positioning a target, such as the target 320 shown in FIG. 3.

For instance, the driver coils at 1102 may be configured to receive an alternating current from a power source (e.g., an IC), while sensor coils are positioned to couple to the magnetic flux fields generated by the driver coils. In one implementation, the magnetic flux field may be concentrated through a movement of the driver coils with respect to the sensor coils. In the implementation of FIG. 11, the magnetic flux field may be concentrated by a movement of a magnetically active and proximately positioned ferrite target.

At 1104, a metal layer may be used behind the target to improve efficiency and to make magnetic flux peaks more pronounced and detectable. For instance, placement of a conductive back shield may reduce power consumption. The shield may additionally concentrate the magnetic flux and improve coupling between the driver and sensor coils.

At 1106, power may be supplied to the driver coils. For example, direct current supplied from smart phone batteries may be converted to alternating current. In one configuration, the A/C current (and ultimately the associated position measurements) may be rapidly turned on and off to preserve power. The rapid toggling in one embodiment of the system may be performed as desired to either continuously provide the driver coil with power, or to cycle the power-on time to conserve energy. For instance, position measurements may not be continuously taken. Position measurements in one scenario are only taken when needed as part of a duty cycle. The system may instead send pulses to preserve power and avoid damage to vulnerable circuitry. Inductive resonant principles may be used to preserve power and reduce electromagnetic interference caused by the magnetic fields of the driver coil.

Moreover, an LC resonant frequency and a driver coil frequency, as well as the duty cycle, may be determined to minimize an amount of energy used during an operation to determine a position measurement. In one example, ZVS converter techniques may be used at 1106 to increase efficiency and to minimize electromagnetic interference associated with the driver coil. The driver coil (e.g., an inductor) may or may not have a series or parallel capacitor added in circuit, depending on the application and mechanical design.

At 1108, the driver coils may generate a magnetic field in response to the receiving the A/C pulses. That is, the driver coils function as an inductor that stores energy and generates a magnetic field.

A change in the magnetic flux may occur at 1110. For instance, the magnetic flux path inductance and other flux characteristics may be changed due to the movement of the target.

At 1112, the sensor coils may generate a voltage in response to picking up the magnetic flux generated at 1110. As discussed herein, the sensor coils may include overlapping coils, among other configurations, to obtain sufficient position accuracy in order to enable high resolution and accuracy.

In an implementation of the method 1100, an algorithm may be applied to evaluate the voltage at 1114. The algorithm may be executed by a processor of the integrated circuit to monitor the voltage changes in the sensor coils in order to determine voltage peaks with respect to generated alternative current voltages. Digital filtering of the coil voltage measurements may also be used.

The algorithm may additionally account for coil and flux linkages associated with connecting traces at 1114. Minimum system power consumption may be determined by generating a three-dimensional plot or by otherwise characterizing coil signal strength and a power dissipation figure of merit versus a resonant frequency and PWM drive frequency.

Input filters may be used at 1116 to remove system noise that could otherwise degrade the accuracy of a position measurement. These filters may be incorporated into the integrated circuit.

At 1118, the algorithm may monitor and graph voltage changes in the particular sensor coils. In one example, a curve fitting technique may be applied to coil voltages to determine the coils based on voltage peaks with respect to generated alternative current voltages. In another or the same example, the system may map peak coil voltages to known coil. For instance, the algorithm may recognize that a peak voltage at a coil may indicate that a target is proximate the particular coil or set of coils. Since the target moves in conjunction with the display screen, the algorithm may determine an x-y position based on location of the coil that is associated with the voltage peak.

At 1120, the system may associate the coils experiencing peak voltages with a position of the display screen. In a particular embodiment, the physical location of the coils may be logically mapped and stored in association with a known phone position. For instance, the algorithm may recognize that a peak voltage at a coil may indicate that a target is proximate the particular coil or set of coils. Since the target moves in conjunction with the display screen, the algorithm may determine an x-y position based on location of the coil that is associated with the coil registering the voltage peak. While implementations explained herein have shown coils for x position monitoring, one skilled in the art will appreciated that x-y positioning is contemplated with other coil structures. A loop back to 1108 indicates than an embodiment of the method 1100 may continuously monitor the movement of the screen slider and associated voltage, electromagnetic, magnetic, or inductive measurement to assess its current position.

The determined position may be output or otherwise communicated at 1122 to the operating system of the computing device. The operating system at 1124 may use the position information to configure the display of the display screen to maximize space for GUI placement given the selected display area (as indicated by the communicated position).

The position determining techniques of the method 1100 may provide accurate x-y positioning the display screen while operating at a wireless power consumption level. That is, the system may be powered by the relatively thin-type batteries that are found in smart phones and other handheld computing devices. In so doing, the method 1100 may enable high resolution.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. For example, some implementations include one or more processors of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods.

Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
    generating a magnetic field by providing an alternating current to a driver coil,
        wherein the magnetic field is affected by a magnetically-active target configured to move in relation to the driver coil and a sensor coil through sliding of a first section of a computing device relative to a second section of the computing device,
        wherein the first section and the second section are configured to slide to change a size of a top surface of the computing device, and
        wherein a size of a viewable portion of a flexible display screen mounted to the first section and the second section changes with the changing size of the top surface of the computing device, with a non-viewable portion of the flexible display screen sliding underneath one of the first section and the second section;
    generating a voltage at the sensor coil in response to the magnetic field; and
    determining a linear position of the flexible display screen by executing an algorithm at a processor,
        wherein an input to the algorithm comprises voltage data associated with the voltage generated at the sensor coil, the linear position of the flexible display screen corresponding to the size of the viewable portion of the flexible display screen between a minimum size and a maximum size.

2. The method of claim 1, further comprising measuring a change in the voltage generated at the sensor coil, wherein the change detected corresponds to movement of the flexible display screen.

3. The method of claim 1, further comprising positioning a back shield proximate the magnetically-active target, wherein the back shield is conductive or non-conductive.

4. The method of claim 1, further comprising positioning the magnetically-active target such that the magnetically-active target moves in association with the flexible display screen.

5. The method of claim 1, further comprising configuring the magnetically-active target to couple to at least one of the driver coil and the sensor coil when the magnetically-active target is moved into proximity of the at least one of the driver coil and the sensor coil,
    wherein the magnetically-active target electromagnetically, magnetically, or inductively couples to the least one of the driver coil and the sensor coil, wherein the magnetically-active target comprises at least one of a metallic material, a ferrous material, or another material affecting a magnitude or intensity of a magnetic field.

6. The method of claim 1, further comprising configuring the magnetically-active target to be one of a plurality of magnetically-active targets to couple to at least one of the driver coil and the sensor coil, wherein the magnetically-active target electromagnetically, magnetically, or inductively couples to the least one of the driver coil and the sensor coil.

7. The method of claim 1, wherein executing the algorithm includes executing at least one of:
    applying at least one of a noise filter and zero voltage switching to at least one of the voltage and the magnetic field to remove system noise,
    curve fitting,
    portioning and fitting, and
    weighted voting algorithms.

8. The method of claim 1, further comprising rapidly cycling the alternating current on and off to the driver coil.

9. The method of claim 1, further comprising positioning an additional sensor coil to overlap the sensor coil.

10. The method of claim 1, further comprising configuring the sensor coil to include at least one of a singled-ended coil and a differential coil.

11. The method of claim 1, further comprising using an inductive resonant frequency and a driver coil frequency as inputs to the algorithm.

12. The method of claim 1, wherein the magnetically-active target comprises a ferrite target.

13. The method of claim 1, wherein the sensor coil and driver coil are stacked relative to one another.

14. An integrated circuit comprising:
    a memory storing an algorithm; and a processor configured to access the memory and execute the algorithm to:
receive voltage data associated with a voltage generated at a sensor coil,
wherein the voltage is generated in response to a magnetic field generated at a driver coil,
wherein the magnetic field is affected by a magnetically-active target configured to move in relation to the driver coil and the sensor coil through sliding of a first section of a computing device relative to a second section of the computing device,
wherein the first section and the second section are configured to slide to change a size of a top surface of the computing device, and
wherein a size of a viewable portion of a flexible display screen mounted to the first section and the second section changes with the changing size of the top surface of the computing device, with a non-viewable portion of the flexible display screen sliding underneath one of the first section and the second section; and
determine a linear position of the flexible display screen using the voltage data, the linear position of the flexible display screen corresponding to the size of the viewable portion of the flexible display screen between a minimum size and a maximum size.

15. The integrated circuit of claim 14, wherein at least one of the driver coil and the sensor coil are configured to move with respect to the other of the other of driver coil and the sensor coil.

16. The integrated circuit of claim 14, wherein a change of voltage at the sensor coil corresponds to movement of the flexible display screen.

17. The integrated circuit of claim 14, wherein the sensor coil includes at least one of a singled-ended coil and a differential coil.

18. A non-transitory computer-readable medium comprising instruction that, in response to execution of the instructions by a processor, cause the processor to perform the following operations:
receive voltage data associated with a voltage generated at a sensor coil,
wherein the voltage is generated in response to a magnetic field generated at a driver coil,
wherein the magnetic field is affected by a magnetically-active target configured to move in relation to the driver coil and the sensor coil through sliding of a first section of a computing device relative to a second section of the computing device,
wherein the first section and the second section are configured to slide to change a size of a top surface of the computing device, and
wherein a size of a viewable portion of a flexible display screen mounted to the first section and the second section changes with the changing size of the top surface of the computing device, with a non-viewable portion of the flexible display screen sliding underneath one of the first section and the second section; and
determine a linear position of the flexible display screen using the voltage data, the linear position of the flexible display screen corresponding to the size of the viewable portion of the flexible display screen between a minimum size and a maximum size.

* * * * *